United States Patent Office 3,109,810
Patented Nov. 5, 1963

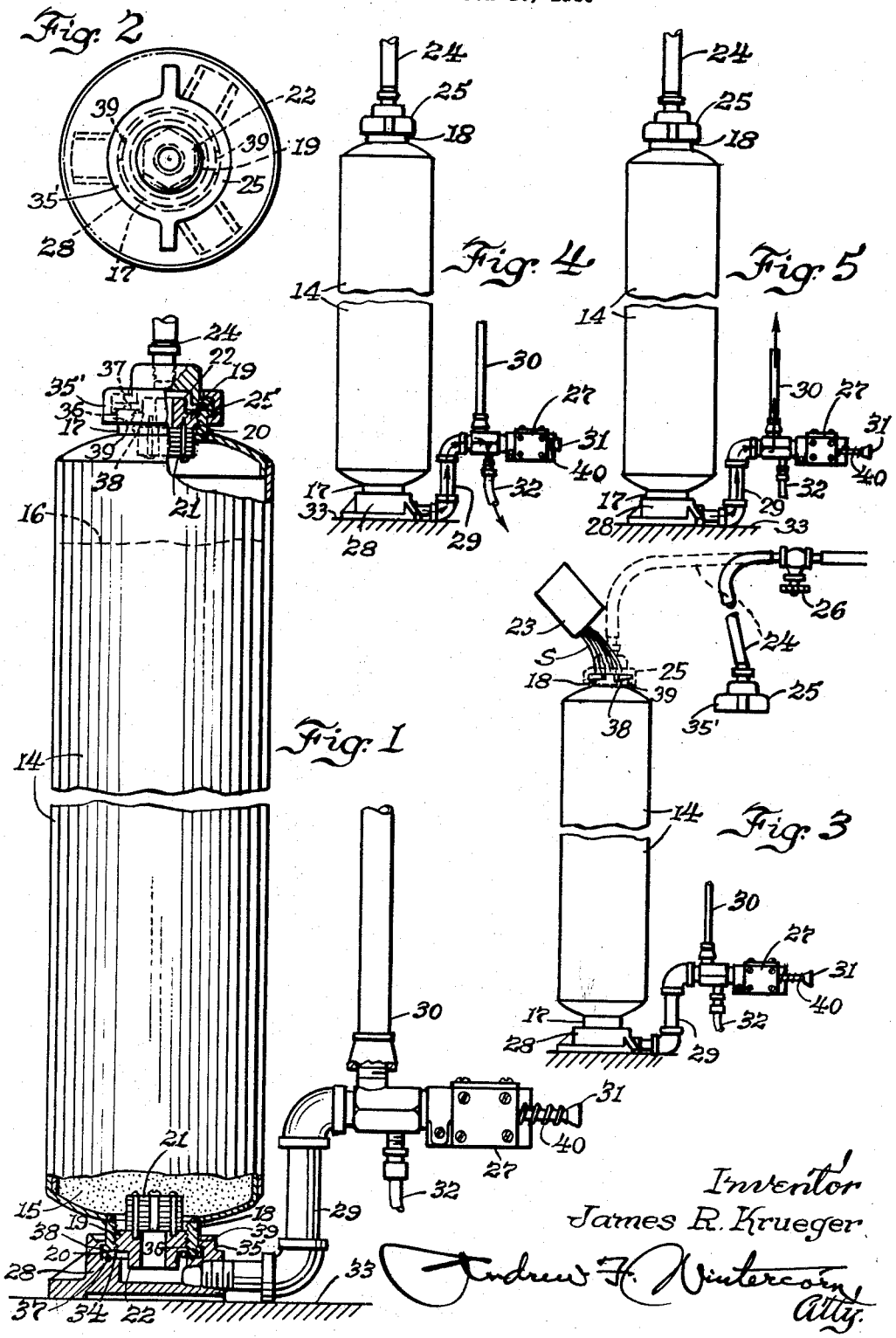

3,109,810
WATER SOFTENERS
James R. Krueger, 24 S. Hooker, Freeport, Ill.
Filed Mar. 16, 1960, Ser. No. 15,286
3 Claims. (Cl. 210—138)

This invention relates to water softeners of the base exchange type and a new and novel method of regeneration thereof, and is more particularly concerned with what are commonly referred to as "rental" type softeners of the internal salting or brining type, the same being designed to be installed on the basis of a rental contract under which the renter pays a stipulated monthly rental fee to the company owning the softener, and the softener is regenerated periodically by one of the company's service men.

Various designs of rental type softeners have been proposed, the two most commonly known being the type in which the mineral is in bags which are removable and replaceable for the substitution of regenerated mineral for exhausted mineral, which type is unsanitary for obvious reasons, and the other type being ones in which the tank containing the mineral is adapted to be disconnected from the line to permit substitution of another tank with regenerated mineral, the tank with the exhausted mineral being hauled back to the central plant for regeneration of the mineral in a large number of these tanks in one operation, or regeneration of the mineral after removal from the tanks in one large scale regeneration operation, which type, while more sanitary, is nevertheless objectionable from the standpoint of the hard work involved and high labor costs in their servicing.

It is, therefore, the principal object of my invention to provide rental type softeners of the internal salting or brining type which are just as sanitary, if not more sanitary, than the last mentioned type but designed to be regenerated with much less effort on the part of the service man and at a considerable saving in time and overall cost of servicing, inasmuch as all of the heavy hauling work involved in the other type is eliminated and the regeneration of the softener is attended to semi-automatically at the installation instead of in a distant plant, the present softeners requiring very little additional equipment per unit over the other type mentioned in order to obtain the desired semi-automatic operation.

In the rental type softeners of my invention I prefer to have the tank that contains the mineral quickly detachably connected at its lower end to a base and also quickly detachably connected at its upper end with a flexible pipe connection, the base and top connections being normally the soft water outlet and raw water inlet connections, respectively, in the service system, the tank having in both ends threaded hollow plugs carrying strainer heads to insure good distribution of water flow and also confine the mineral, both plugs being readily removable by application of a wrench to a protruding polygonal shaped end portion, so that after a softener that requires regeneration has been disconnected and turned upside down preliminary to the regeneration, salt or brine can be poured in after removal of the plug and then, when the plug is replaced and the tank connected to the raw water supply, and the supply valve opened after setting the automatic rinse valve, the softener is automatically thrown into regeneration, consisting only of an inverted rinse, after which the automatic valve returns to its normal service position returning the softener to service.

The invention is illustrated in the accompanying drawing, in which—

FIG. 1 is a side view of a rental type softener made in accordance with my invention, the top and bottom portions being broken away to show the removable hollow plugs and strainer heads;

FIG. 2 is a top view of FIG. 1;

FIG. 3 is a view similar to FIG. 1 but on a smaller scale, showing the tank reversed end for end preparatory to the regeneration of the softener, and indicating the removable cap in dotted and full lines applied to the softener and suspended alongside it, respectively, and FIGS. 4 and 5 are views similar to FIG. 1, showing the direction of water flow during regeneration in FIG. 4 and during softening in FIG. 5.

The same reference numerals are applied to corresponding parts throughout the views.

Referring to FIGS. 1 to 5, the reference numeral 14 designates a softener tank containing zeolite or other base exchange water softening mineral 15 approximately up to the level indicated at 16 in FIG. 1, and having identical necks 17 and 18 projecting from the opposite ends thereof, in each of which a hollow plug 19 is threaded, as indicated at 20. Each of these plugs 19 carries on its inner end a strainer head 21 which serves to insure good distribution of water flow and also to retain the mineral 15. Each plug has a protruding hexagonal outer end portion 22 which serves as a handle for unthreading the plug by hand when salt or brine is to be poured in after the softener that requires regeneration has been disconnected and turned upside down, as shown in FIG. 3, preliminary to the regeneration. In FIG. 3 there is shown a container 23 from which salt (or brine), indicated at S, is being poured into the upper end of the tank 14 through the neck 18 after removal of the plug 19 for this purpose, while in FIG. 4, where the plug 19 has been replaced, the raw water supply line is connected by means of a flexible hose 24 and cap 25 to the top of the softener. Then, all that remains is for a shut-off valve 26 in the raw water line to be opened and the automatic rinse valve 27, that is connected to the base 28, as at 29, and to the service pipe 30, to be set in the regeneration position by first winding and setting its timer T and pushing in its plunger 31, so as to allow the softener to be given what I call an inverted rinse. All of the waste water and spent brine in this operation is conducted to the drain through a flexible hose connection 32 which may be provided of a length suitable to reach an adjacent floor drain. The base 28 rests on the floor indicated at 33 in FIG. 1, and has a flat seat 34 provided therein at the inner end of the lower end of a neck 35, on which the flat end face 36 of either of the necks 17 and 18 is adapted to rest while a water tight seal is insured by an O-ring 37 provided in an annular groove next to the seat 34. Each of the necks 17 and 18 has two wedge-shaped arcuate lugs 38 provided thereon in circumferentially spaced relation, which wedgingly engage under diametrically opposed lugs 39 provided in the neck 35 on the base 28 and in the neck 35 on the cap 25, to provide a quickly detachable water tight connection between the tank 14 and the cap 25 or base 28 when either of the necks 17 and 18 is presented for such connection with the cap or base. Thus, in FIG. 1, the neck 17 is uppermost and is connected with the cap 25 while the neck 18 is lowermost and is connected with base 28, whereas in FIGS. 3, 4 and 5 the tank has been inverted and neck 17 being lowermost, is then connected with the base 28, while neck 18 is connected with cap 25. The cap 25, as shown in section in FIG. 1, is of two-piece construction, as is common for caps of this general type, the central or inner body part setting on top of the neck of the softener tank and having an O-ring for a water-tight seal, and the ring-shaped outer piece carrying the lugs 39 thereon for wedging engagement under the lugs 38 on the neck and having diametrically opposed handles projecting radially therefrom for manipulation to and from the tightened position.

No invention is claimed in the automatic rinse valve 27 per se, such valves being well known, as shown, for example, in Lindsay Patent No. 2,610,147. It is not necessary, therefore, to illustrate this valve 27 in detail, and it is sufficient to state that the plunger 31, which is normally held in the "out" or service position by means of a coiled compression spring 40, is shiftable by hand to the "in" or rinse position against the action of the spring 40, and is suitably held in that position by a catch until the timer on the valve 27 releases the catch at the end of a predetermined time interval, like say one hour, allowing the plunger 31 to return to service position. The plunger 31 is shown in the regeneration position in FIG. 4, shutting off the connection with service line 30 and permitting restricted flow from the lower end of the tank to the drain 32. In the other FIGURES 1, 3 and 5, plunger 31 is shown in service position permitting unrestricted flow from the lower end of the tank 14 to the service pipe 30.

In operation, therefore, assuming that the softener shown in FIG. 1 is in service, the hard water entering the top of the tank 14 through hose 24 passes through the mineral 15 for softening, and the softened water discharged from the lower end of the tank is delivered to the service system through pipe 30. After the usual period of softening, when the mineral 15 requires regeneration, the service man first closes the raw water supply valve 26 (FIG. 3) and disconnects the cap 25 from the upper end of the tank 14. The cap 25, when removed from the tank, hangs alongside the upper end of the tank, as seen in FIG. 3, because of the offsetting of the upper connection of the hose 24 with the supply line, and that makes it handy for removing the plug 19 from the upper end of the tank later, after the tank has been inverted. It requires only a slight turn to disconect the lower end of the tank from the base 28. Then, after allowing enough water to run out to lighten the tank, the service man turns the tank upside down, connecting the neck 17 to the base 28, as illustrated in FIGS. 3, 4 and 5, whereupon the plug 19 is removed from what is now the upper end of the tank and a predetermined amount of salt (or brine) is poured in, as indicated at S in FIG. 3, sufficient for the substantially complete regeneration of the mineral 15. Then the plug 19 is replaced in the upper end of the tank and the cap 25 is connected thereto, similarly as in FIG. 1, and all that remains then is to wind and set the timer on the automatic rinse valve 27 and push the plunger 31 in, as shown in FIG. 4, and open the valve 26, whereupon the incoming raw water dissolves the salt, and the brine thus produced passes downwardly through mineral 15 to regenerate it, the spent brine leaving the bottom of the tank being conducted to the drain through tube 32, as illustrated in FIG. 4. The downward flow through the bed of mineral will, of course, also wash out most, if not all, of the silt previously deposited on top of the bed during the softening period, as that top portion of the bed is then at the bottom by virtue of the reversal of the tank. If the bed has become channeled during the service run, as sometimes occurs, especially where the water pressure varies considerably from time to time, the inversion of the tank preliminary to the regeneration is, of course, of great benefit because it breaks up the channels and generally restores the bed to a more homogeneous condition and therefore insures most efficient use of the salt (or brine) in regenerating all portions of the mineral bed. When the timer on automatic rinse valve 27, which predetermines the length of the rinse operation according to its setting, releases the plunger 31, the latter returns under action of its return spring 40 to the position shown in FIGS. 1, 3, and 5, thereby returning the softener to service.

It is believed the foregoing description conveys a good understanding of the objects and advantages of my invention. The appended claims have been drawn to cover all legitimate modifications and adaptations.

I claim:
1. A water softener of the service type comprising, in combination, a fixed hollow base having a lateral outlet opening provided therein to which a conduit is connected for conducting water therefrom to a service system, a vertically disposed tank of elongated form containing a bed of granular water softening material and having hollow neck portions on the upper and lower ends that are alike for use interchangeably in mounting the tank for support on said base, both necks being of the same enlarged radius approximately half the radius of the tank and internally threaded and having flat outer ends, a hollow externally threaded plug detachably threaded in each neck having a reduced rotatable handle portion extending outwardly from the neck for manual rotation of said plug, each plug carrying a strainer head extending therefrom inwardly into the tank to serve as a water distributor while retaining water softening material in the tank, a hollow cap for application to the neck on the other end of said tank having an inlet opening provided therein to which a raw water supply conduit is connected to conduct raw water into said tank, said cap and base being each provided with a recess to accommodate the protruding handle portions on the plugs, coupling means on the outer side of said neck portions, and coupling means in said base and cap, cooperating with the last mentioned coupling means, whereby said tank although supported on said base solely by this connection is connectible to or detachable from said base by a partial turn of the tank by hand relative to said base, and whereby said cap is also quickly connectible to or detachable from said tank, said base and cap having flat surfaces therein for abutment by the flat outer ends of the neck portions with gaskets interposed therebetween for water tight connections at said cap and base, said tank being reversible end for end whereby to mount the same by either end on said base.

2. A service type water softener as set forth in claim 1 wherein the raw water supply conduit connected to said cap is a flexible hose to permit easy lateral movement of the cap relative to said tank in connecting and disconnecting the raw water supply, and wherein the cap is composed of two parts, one of which is of hollow circular form and is connected with the hose for water delivery thereto and arranged to be placed in water tight connection with the neck on the tank, and the other is ring-shaped and has rotary bearing contact on the first part and is detachably connectible to the outside of the neck on the tank by rotation relative thereto.

3. A service type water softener as set forth in claim 1 including a rinse valve interposed between the outlet opening in the base and the service conduit and having a manually shiftable plunger which in the normal service position permits flow of water from the outlet opening in the base to the service conduit but in a shifted position for regeneration connects said outlet opening with a drain, said plunger having spring means for returning it to its normal position, and said rinse valve including timing means whereby said plunger may be set manually in shifted position against resistance of said spring means for a predetermined time interval.

References Cited in the file of this patent
UNITED STATES PATENTS

| | | |
|---|---|---|
| 608,127 | Islev-Petersen | July 26, 1898 |
| 1,698,743 | Sweeney | Jan. 15, 1929 |
| 1,860,926 | Eisenhauer | May 31, 1932 |
| 2,370,190 | Ralston | Feb. 27, 1945 |
| 2,435,975 | McGill | Feb. 17, 1948 |
| 2,572,082 | Welsh | Oct. 23, 1951 |
| 2,589,136 | Ralston | Mar. 11, 1952 |
| 2,607,728 | Albertson | Aug. 19, 1952 |
| 2,610,147 | Lindsay | Sept. 9, 1952 |